United States Patent [19]

Kobashi et al.

[11] Patent Number: 4,565,832
[45] Date of Patent: Jan. 21, 1986

[54] PROCESS FOR PRODUCING PACKING MATERIAL FOR USE IN LIQUID CHROMATOGRAPHY

[75] Inventors: Toshiyuki Kobashi; Shoyo Takagi; Hideo Naka, all of Okayama, Japan

[73] Assignee: Japan Exlan Company Limited, Osaka, Japan

[21] Appl. No.: 677,678

[22] Filed: Nov. 30, 1984

[30] Foreign Application Priority Data

Feb. 8, 1984 [JP] Japan .................................. 59-22633

[51] Int. Cl.$^4$ ................................................. C08J 9/28
[52] U.S. Cl. .......................................... 521/63; 521/31; 521/114; 524/114; 524/751; 210/635; 502/402; 526/204
[58] Field of Search ................ 524/114, 751; 521/63, 521/114, 31; 210/635; 502/402; 526/204

[56] References Cited

U.S. PATENT DOCUMENTS

| 2,783,250 | 2/1957 | Payne et al. | 524/114 |
| 3,002,823 | 10/1961 | Flodin et al. | 210/635 |
| 3,150,112 | 9/1964 | Toy | 524/114 |
| 3,247,154 | 4/1966 | Masters et al. | 524/751 |
| 3,714,112 | 1/1973 | Stange | 524/114 |
| 4,216,083 | 8/1980 | Dale et al. | 210/635 |
| 4,338,172 | 7/1982 | Via | 524/751 |
| 4,339,500 | 7/1982 | Yanagihara et al. | 210/635 |
| 4,497,710 | 2/1985 | Wagu et al. | 210/635 |

FOREIGN PATENT DOCUMENTS

| 55-164208 | 12/1980 | Japan | 526/204 |
| 56-164955 | 12/1981 | Japan | 210/635 |
| 601184 | 7/1960 | United Kingdom | 524/114 |
| 601541 | 7/1960 | United Kingdom | 524/114 |
| 848350 | 9/1960 | United Kingdom | 524/114 |
| 983516 | 2/1965 | United Kingdom | 524/114 |

*Primary Examiner*—Joseph L. Schofer
*Assistant Examiner*—N. Sarofim
*Attorney, Agent, or Firm*—Wenderoth, Lind & Ponack

[57] ABSTRACT

The present invention relates to a process for producing a packing material for use in liquid chromatography which comprises aqueous suspension polymerizing vinyl acetate, a (meth)acrylic acid ester or a glycidyl monovinyl ester or ether with a monomer mixture composed mainly of a cross-linking monomer in the presence of a diluent selected from among epichlorohydrin and glycidyl ethers and thereafter removing it from the resulting polymer particles by ring-opening the epoxy groups in said diluent. This process provides a packing material for use in liquid chromatography which is uniform and porous and moreover is excellent in mechanical strength.

4 Claims, 2 Drawing Figures

PROCESS FOR PRODUCING PACKING MATERIAL FOR USE IN LIQUID CHROMATOGRAPHY

BACKGROUND OF THE INVENTION (a) Field of the Invention

The invention relates to a process for producing a packing material for use in liquid chromatography in which a specific epoxy-containing organic compound is used as the diluent.

(b) Description of the Invention

At present, liquid chromatography is a technique which is indispensable for the analisis, separation, etc. of nonvolatile substances. The market related to liquid chromatography is expanding rapidly. Accordingly, fierce competition in its technical development is being carried on by many companies. As one of the methods of regulating the separation ability of liquid chromatography, it is known to change the shape or amount of the pores in the filler. Among the methods of controlling the pores, the method exclusively used is to vary the molecular weight or cross-link density (amount of cross-linking agent) of the polymer. However, when the cross-link density is increased, the polymer particles become denser and the pore diameters smaller. This lowers the separation ability. Also, when the cross-link density is decreased, the mechanical strength of the polymer particles becomes lower. This constitutes a great obstacle to high-speed liquid chromatography.

Accordingly, a method was proposed as described in Japanese Patent Publication No. 31925/1982 which comprises aqueous suspension-polymerizing vinyl acetate with a cross-linking agent in the presence of an organic solvent as a diluent such as nitromethane or toluene which can be mixed with the monomer but is poorly miscible with water, saponifying the polymer and thereafter cross-linking the saponified polymer to produce a polyvinyl alcohol gel which is solid and porous.

However, by such a method in which an organic solvent is used as the diluent, it is necessary, in order to remove the diluent from the resulting polymer, to extract it with another organic solvent. If either of the solvents for dilution or extraction remains in the polymer, there will be a limitation to the field of application or an evil influence to the separation ability, so that there is a need for a complicated process for solvent removal and washing.

We conducted research into a process for producing a packing material for use in liquid chromatography which does not have the above-mentioned various defects. As a result, we have found that, by aqueous suspension polymerization in the presence of a specific epoxy group-containing compound as the diluent, it is possible to extract and remove the diluent from the resulting polymer easily with water without requiring any complicated process, and it is possible to produce a packing material for use in liquid chromatography which is uniform and porous and moreover is excellent in mechanical strength. The present invention is based on this discovery.

An object of the present invention is to provide a process for producing, in an industrially advantageous manner, a uniform and porous packing material for use in liquid chromatography which is excellent in mechanical strength.

Another object of the invention is to provide a process for producing a packing material for use in liquid chromatography which can be easily removed from the diluent with water, and which is not limited for the field of application and has no evil influences on the separation ability and work environment.

A further object of the invention is to provide an industrial process for producing a packing material for use in liquid chromatography, whose diameters of the pores in the resulting polymer can be easily regulated by suitably selecting the kind of specific epoxy group-containing compounds, and which therefore has various pore diameters applicable to many fields of use.

Other objects of the invention will become apparent from the following concrete explanation.

SUMMARY OF THE INVENTION

Such objects of the present invention can be attained by aqueous suspension-polymerizing vinyl acetate, a (meth)acrylic acid ester, or glycidyl monovinyl ester or ether with a monomer mixture composed mainly of a cross-linking monomer in the presence of a diluent selected from among epichlorohydrin and glycidyl ethers, and thereafter removing it from the resulting polymer particles by ring-opening and hydrophilizing the epoxy groups in said diluent.

DETAILED DESCRIPTION OF THE PREFERRED EMBODIMENT

In the following, the present invention is explained in detail.

First, it is necessary that the monomers used in the present invention should be selected from among vinyl acetate, (meth)acrylic acid esters and glycidyl monovinyl esters or ethers. Examples of acrylic acid esters are methyl acrylate, ethyl acrylate, butyl acrylate, polyoxyalkylene acrylate, etc. and examples of methacrylic acid esters are methyl methacrylate, ethyl methacrylate, butyl methacryalte, polyoxyalkylene methacrylate, etc. Glycidyl monovinyl esters or ethers include glycidyl esters of monovinyl carboxylic acids having 3 to 12 carbon atoms, or glycidyl ethers of monovinyl alcohols having 3 to 12 carbon atoms. Examples of such esters or ethers are glycidyl acrylate, glycidyl methacrylate, allyl glycidyl ether, etc.

Among the cross-linking monomers may be mentioned divinylbenzene, ethylene glycol diacrylate, ethylene glycol dimethacrylate, propylene glycol diacrylate, propylene glycol dimethacrylate, polypropylene glycol diacrylate, polypropylene glycol dimethacrylate, glycerin diacrylate, glycerin dimethacrylate, N,N'-methylenebisacrylamide, divinyl succinate, diallyl succinate, vinyl methacrylate, allyl methacrylate, triallyl cyanurate, etc.

In combination with the above-mentioned monomers which are the main components, other monomers copolymerizable therewith may be suitably used. As such other monomers may be mentioned vinyl halides and vinylidene halides, ethylenic unsaturated carboxylic acids and salts thereof, ethylenic unsaturated sulfonic acids and salts thereof, acrylamide, etc.

As the diluents that constitute the most important point of the invention, it is possible to use those compounds which have epoxy group(s) and can become water-soluble or easily extractable with water by the ring opening and hydrophilization of said epoxy group(s). For example, they include epichlorohydrin and glycidyl ethers represented by the following formulas from (I) to (III):

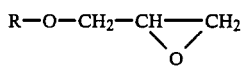 (I)

wherein R is an alkyl group having 1 to 6 carbon atoms,

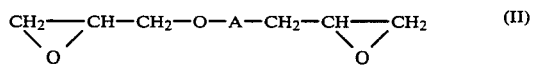 (II)

wherein A is: $(CH_2—CH_2—O)_a$ (a is an integer from 1 to 5), $(CH_2—CH(CH_3)—O)_b$ (b is an integer from 1 to 10), $CH_2—(CH_3)_2—CH_2—O$, $(CH_2)_6—O$, or $CH_2—CH(OH)—CH_2—O$,

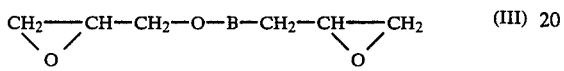 (III)

wherein B is:

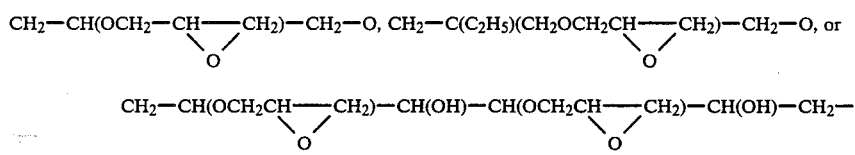

Among others, epichlorohydrin and the glycidyl ethers represented by the above-mentioned general formula (I) are preferable as the diluent in respect of the separation ability of the final product and from an industrial viewpoint.

The amount of the diluent to be used should be varied depending on the application field of the packing material, the amount of pores (porosity) or the diameters of pores demanded, the kind of the diluent, etc. Therefore, it is difficult to determine it definitely. However, it is desirable to set it so that the weight ratio of monomer to diluent should be generally within the range of from 10/1 to 1/10, preferably within the range of from 5/1 to 1/5.

The monomer concentration in the polymerization system should be set so that the weight ratio of the total of monomer and diluent to water is generally within the range of 5/100 to 80/100, preferably 10/100 to 30/100.

As for the polymerization condition, it is suitably set within the range of temperature of 40° to 90° C., preferably 50° to 70° C. and within the time range of 0.5 to 5 hours. As for the polymerization initiators, it is possible to use know oil-soluble radical polymerization initiators such as organic peroxides, azo compounds, etc.

As for the ring-opening and hydrophilization method of the epoxy groups in the diluent, the method is not limited so far as the diluent can become water-soluble or become hydrophilic to the degree that it is easily extractable and removable with water. For example, hydrolysis, reaction with amino groups, reaction with acid sulfurous acid, sulfurous acid or salts thereof may be mentioned. However, hydrolysis by inorganic acids such as nitric acid, sulfuric acid, hydrochloric acid, phosphoric acid, etc. or organic acids such as formic acid, acetic acid, hydroxyacetic acid, benzenesulfonic acid, toluenesulfonic acid, etc. or hydrolysis with alkalis such as alkali-metal hydroxides is preferable. Since alkalis have a strong tendency of breaking the ester bond in the polymer, it is especially desirable to use an acid condition.

The diluent thus ring-opened and made hydrophilic is easily removed by water-washing from the polymer particles.

By following the process of the present invention (especially by using a specific epoxy group-containing compound as diluent), it becomes possible to form uniform pore diameters in the resulting polymer particles because of good compatibility between the diluent and the monomer and resulting polymer. Accordingly, it becomes possible to form porous particles without impairing the mechanical strength, and thus finally it becomes possible to provide a packing material for use in liquid chromatography which is excellent in the separation ability. By regulating the amount of the diluent which is caused to exist in the polymerization system, it is possible to regulate easily the porosity (the amount of pores) of the resulting polymer particles. Also, by suitably selecting the kind of the epoxy-containing compound used as the diluent (e.g. the length of the carbon chain, the number of epoxy groups, etc.), it is possible to easily regulate the pore diameters in the resulting polymer particles. Moreover, the diluent is easily made hydrophilic and is removed by water-washing, etc., so that in producing the packing material for use in liquid chromatography, there is no anxiety for evil effects due to the diluent on the separation ability or on the use field. These are the effects of the present invention deserving special mention.

Thus, the porous polymer particles, whose particle diameter is generally from 5 to 300μ, and gel water content is from 30 to 2000%, preferably 50 to 500%, are applied widely as packing materials for use in liquid chromatography, exhibiting an excellent separation ability.

In the following the invention is explained more concretely by way of Examples. However, the invention is not limited for its scope by the description of these Examples. In the Examples, parts and percentages are by weight unless otherwise indicated.

The gel water content is a value obtained as follows: Polymer particles sufficiently in equilibrium with deionized water are treated for five minutes with a centrifuge having a centrifugal effect of 2000 G to remove the water adhering to the particle surface. Then the weight ($W_1$) of the polymer particles are measured. After drying the polymer particles, the weight ($W_2$) is measured. The gel water content is obtained by the following formula:

$$\text{Gel water content} = \frac{W_1 - W_2}{W_2} \times 100(\%)$$

EXAMPLE 1

Twenty parts of a water-soluble polymer composed of methacrylic acid and sodium p-styrenesulfonate in the ratio of 70:30 and two parts of polyvinyl alcohol (having a degree of polymerization of 1000 and a degree of saponification of 87%) were dissolved in 778 parts of water and the solution was put into a polymerization vessel equipped with a paddle-type stirrer.

Two parts of 2,2'-azobis-(2,4-dimethylvaleronitrile) was dissolved in 200 parts of each of the mixed solutions in which glycidyl methacrylate (GMA), ethylene glycol dimethacrylate (EGMA) and epichlorohydrin (EPC) were varied in the ratio shown in Table 1, and each solution was put into a polymerization vessel. Aqueous suspension polymerization was carried out at 60° C. for two hours under stirring at 300 r.p.m. Then 100 parts of formic acid was added to the polymerization vessel. After treating the polymerization system at 90° C. for 3 hours to ring-open and hydrophilize EPC, the polymer particles were washed with water.

The average particle diameter and gel water content of the thus-obtained polymer particles were measured and the results are shown in Table 1.

TABLE 1

| No. | 1 | 2 | 3 | 4 | 5 |
|---|---|---|---|---|---|
| GMA/EGMA/EPC | 100/10/0 | 100/10/0 | 100/10/100 | 100/10/300 | 100/10/500 |
| Average particle diameter ($\mu$) | | 82 | 75 | 77 | 68 |
| Gel water content (%) | 13 | 53 | 110 | 200 | 280 |

Note: No. 1 was omitted for formic acid treatment.

Then the polymer particles (No. 2 and No. 4) were sieved out respectively, and intermediate particles between 150 mesh and 350 mesh particles were taken out. The particles were packed into a glass column (1.5 cm in inner diameter and 30 cm in height), and comparison for the performance as a packing material for use in liquid chromatography was made. As a test specimen, 0.5 cc of an aqueous solution containing 5% cow blood serum and 2.5% ammonium sulfate was charged into the column. The operation was carried out using deionized water as the eluent at an elution velocity of 60 cc/hour. Elution curves shown in FIG. 1 and FIG. 2 were made.

From the above-mentioned Table and FIGS. 1 and 2, it is clearly understood that the gel water content (the amount of pores in the polymer particles) can be easily controlled by varying the amount of EPC, and that the product of the present invention has an excellent separation ability.

EXAMPLE 2

Polymer particles (No.6) were produced in the same way as in Example 1 No. 3 except that glycidyl butyl ether as the diluent and nitric acid in place of formic acid were used. The gel water content of the polymer particles was 150%.

EXAMPLE 3

Four kinds of polymer particles were made in the same way as in Example 1 except that in place of GMA, methyl methacrylate (MMA) and polyoxyethylene (23 mol) methacrylate (POE) were used, and in place of EGMA, triethylene glycol dimethacrylate (TEG) was used. The results are shown in Table 2.

TABLE 2

| No. | 7 | 8 | 9 | 10 |
|---|---|---|---|---|
| MMA/POE/TEG/EPC | 60/40/10/0 | 60/40/10/100 | 60/40/10/300 | 60/40/10/500 |
| Average particle diameter ($\mu$) | 79 | 73 | 76 | 70 |
| Gel water content | 15 | 71 | 160 | 248 |

From the results shown in the above Table, it is clearly understood that it is possible to obtain polymer particles having an arbitrary porosity (gel water content) by making a diluent exist, in contrast to the case (NO. 7) in which no diluent was used.

Figure 1:
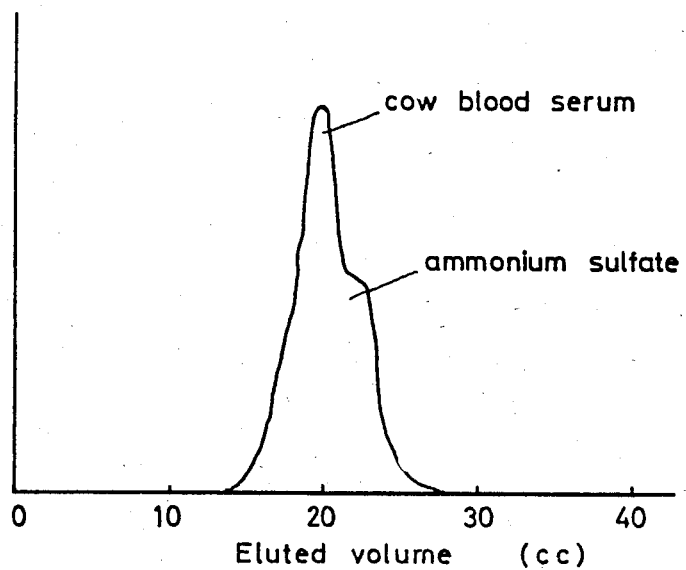
FIG. 1 shows the elution curve obtained from Example 1 (No. 2)
Figure 2:
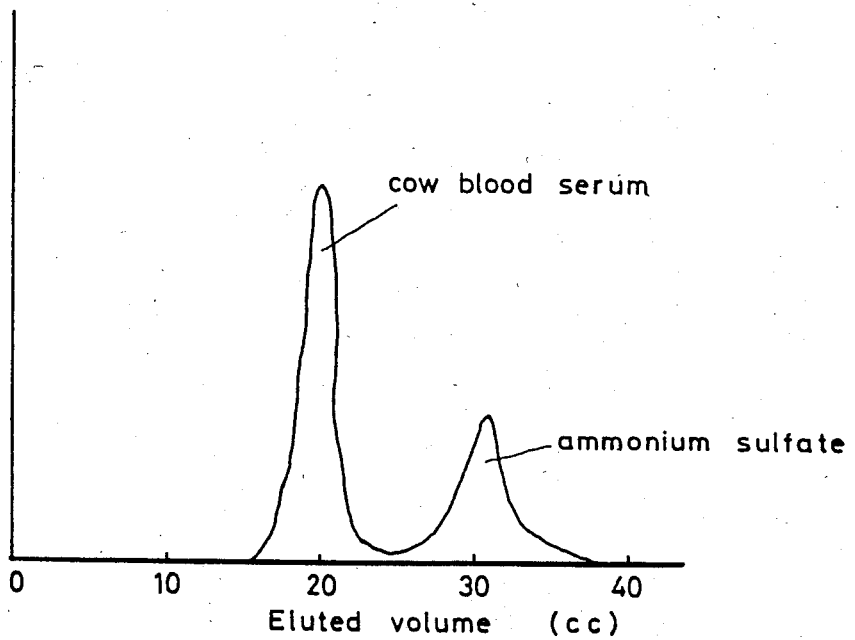
FIG. 2 shows the elution curve obtained from Example 1 (No. 4).

What is claimed is:

1. A process for producing a packing material for use in liquid chromatography which comprises aqueous suspension polymerizing vinyl acetate, a (meth)acrylic acid ester, or a glycidyl monovinyl ester or ether with a monomer mixture composed mainly of a cross-linking monomer in the presence of a diluent selected from among epichlorohydrin and glycidyl ethers, treating the resultant polymer particles so as to ring-open and hydrophilize epoxy groups in said diluent contained in said polymer particles, and washing the treating polymer particles with water.

2. The process as claimed in claim 1 wherein epichlorohydrin or a glycidyl ether represented by the following general formula (I) is used as the diluent:

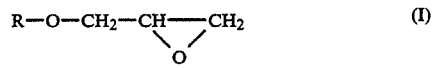

wherein R is an alkyl group having 1 to 6 carbon atoms.

3. The process as claimed in claim 1 wherein the weight ratio of monomer to diluent is set within the range of from 10/1 to 1/10.

4. The process as claimed in claim 1 wherein the weight ratio of the total of monomer and diluent to water is set within the range of from 5/100 to 80/100.

* * * * *